United States Patent
Landman et al.

(10) Patent No.: US 9,995,427 B2
(45) Date of Patent: Jun. 12, 2018

(54) FRAME SUPPORTED HEIGHT ADJUSTABLE PYLON

(71) Applicant: STELLENBOSCH UNIVERSITY, Stellenbosch (ZA)

(72) Inventors: Willem Adolph Landman, Stellenbosch (ZA); James Nicholas Larmuth, Somerset West (ZA)

(73) Assignee: STELLENBOSCH UNIVERSITY, Stellenbosch (ZA)

( * ) Notice: Subject to any disclaimer, the term of this patent is extended or adjusted under 35 U.S.C. 154(b) by 0 days. days.

(21) Appl. No.: 15/093,022

(22) Filed: Apr. 7, 2016

(65) Prior Publication Data
US 2016/0298804 A1    Oct. 13, 2016

(30) Foreign Application Priority Data
Apr. 7, 2015 (ZA) .................................. 2015/02201

(51) Int. Cl.
*H02S 20/30* (2014.01)
*F16B 7/04* (2006.01)
(Continued)

(52) U.S. Cl.
CPC ............... *F16M 11/24* (2013.01); *F16B 7/18* (2013.01); *F24J 2/52* (2013.01); *F24J 2/526* (2013.01); *F24J 2/5233* (2013.01); *F24J 2/5239* (2013.01); *F24J 2/5264* (2013.01); *H02S 20/30* (2014.12); *F16B 7/0493* (2013.01); *F24J 2/5232* (2013.01); *Y02E 10/47* (2013.01)

(58) Field of Classification Search
CPC ............ E04H 12/2292; E04H 2012/006; F24J 2/5203; F24J 2/5233; F24J 2/5239; F24J 2/5264; F24J 2/523
See application file for complete search history.

(56) References Cited

U.S. PATENT DOCUMENTS 835,281 A * 11/1906 Haskell .................. E04H 12/10
52/651.04
1,553,800 A * 9/1925 Brandt .................... E21B 15/00
182/100

(Continued)

FOREIGN PATENT DOCUMENTS

WO       2014072905 A1    5/2014

*Primary Examiner* — Charles A Fox
*Assistant Examiner* — Charissa Ahmad
(74) *Attorney, Agent, or Firm* — Osha Liang LLP

(57) ABSTRACT

A height adjustable pylon and supporting frame assembly is provided. The frame includes two frame members meeting at a corner with the frame members being generally co-planar and the pylon being urged into the corner so as to extend at generally right angles to a plane including the two frame members. A fastener assembly has two end portions each anchored relative its associated frame member so as to extend transversely to it. The fastener assembly includes an intermediate saddle portion engaging a surface of the pylon that is directed outwardly relative to the corner with the pylon being urged into the corner when the fastener assembly is tightened to engage the pylon and lock it axially relative to the frame members in a selected position. Preferably, the frame members each form two upper and two lower frame members of two trusses. Lower ends of the pylons may support the assembly.

6 Claims, 6 Drawing Sheets

(51) Int. Cl.
*F16M 11/24* (2006.01)
*F24J 2/52* (2006.01)
*F16B 7/18* (2006.01)

(56) References Cited

U.S. PATENT DOCUMENTS

| | | | | |
|---|---|---|---|---|
| 1,813,373 A * | 7/1931 | Wooldridge | ............... | E04C 3/08 52/691 |
| 1,865,059 A * | 6/1932 | Ragsdale | ................. | E04C 3/09 52/691 |
| 2,030,262 A * | 2/1936 | Maddock | ........... | B23Q 11/0003 14/73.1 |
| 2,566,287 A * | 8/1951 | Finneburgh, Jr. | ...... | H01Q 11/16 343/801 |
| 2,736,613 A * | 2/1956 | Jagiel | ........................ | E04G 1/14 52/637 |
| 2,848,757 A * | 8/1958 | Armstrong, Jr. | ........... | E04H 1/12 52/169.9 |
| 3,199,815 A * | 8/1965 | Martinkovic | ........ | F01N 13/1805 180/311 |
| 3,247,629 A * | 4/1966 | Behlen | ...................... | E04B 7/08 52/694 |
| 3,318,561 A * | 5/1967 | Finke | .................... | H01Q 1/1228 248/218.4 |
| 3,386,222 A * | 6/1968 | Troutner | ................... | E04C 3/07 52/693 |
| 3,409,259 A * | 11/1968 | Cross | ....................... | A63B 3/00 24/277 |
| 3,564,783 A * | 2/1971 | Dunne | ..................... | E04C 3/08 248/219.1 |
| 3,570,204 A * | 3/1971 | Birkemier | ............... | E04C 3/292 52/289 |
| 3,925,942 A * | 12/1975 | Hemmelsbach | ...... | E04B 1/3205 135/122 |
| 4,094,116 A * | 6/1978 | Gilb | ........................ | E04C 3/292 403/217 |
| 4,214,841 A * | 7/1980 | Hayashi | .................... | E04G 7/14 403/188 |
| 4,229,742 A * | 10/1980 | Rotunda | ............... | H01Q 1/1228 343/742 |
| 4,624,599 A * | 11/1986 | Piasecki | .................... | B64C 1/06 244/131 |
| 4,957,186 A * | 9/1990 | Reetz | ........................ | E04C 3/08 248/284.1 |
| 5,274,888 A * | 1/1994 | Payne | ...................... | F16L 3/02 24/277 |
| 5,787,673 A * | 8/1998 | Noble | ...................... | E04H 12/085 343/890 |
| 5,920,291 A * | 7/1999 | Bosley | ................. | H01Q 1/1207 343/879 |
| 5,954,305 A * | 9/1999 | Calabro | ............... | H01Q 1/1242 248/219.4 |
| 6,043,795 A * | 3/2000 | Strieffler | ................. | H01Q 1/125 343/880 |
| 6,225,962 B1 * | 5/2001 | Blanchard | .............. | H01Q 1/125 248/514 |
| 6,499,266 B1 * | 12/2002 | Macumber | ................ | E04C 3/08 52/632 |
| 6,561,473 B1 * | 5/2003 | Ianello | ...................... | E04G 7/14 248/214 |
| 6,856,302 B2 * | 2/2005 | Goncalves et al. | .. | H01Q 1/1242 248/219.4 |
| 7,086,207 B2 * | 8/2006 | Piburn | ................. | H01Q 1/1207 248/512 |
| 7,113,145 B1 * | 9/2006 | Noble | ................... | H01Q 1/1228 248/218.4 |
| 7,466,286 B2 * | 12/2008 | Chapman | ............. | H01Q 1/1228 343/874 |
| 7,659,865 B2 * | 2/2010 | Kreitzberg | ........... | H01Q 1/1235 343/880 |
| 8,534,026 B2 * | 9/2013 | Bauman | .................... | E04C 3/32 52/223.4 |
| 8,939,143 B2 * | 1/2015 | Zuritis | ................... | F24J 2/5232 126/569 |
| 8,959,868 B2 * | 2/2015 | Robinson | .................. | E04C 3/08 403/408.1 |
| 8,981,201 B2 * | 3/2015 | Sinclair | ...................... | F24J 2/38 136/243 |
| 9,255,396 B2 * | 2/2016 | Eberhart | ................... | F16B 7/044 |
| 2003/0041856 A1 * | 3/2003 | Blackmon | .................. | F24J 2/07 126/680 |
| 2005/0217936 A1 * | 10/2005 | Jolicoeur | .............. | E01D 19/106 182/130 |
| 2008/0053032 A1 * | 3/2008 | Hockemeyer | ........... | E04B 7/024 52/651.07 |
| 2009/0007901 A1 * | 1/2009 | Luconi | .................... | F24J 2/5239 126/627 |
| 2009/0025775 A1 * | 1/2009 | Parra Cebrian | ........ | F24J 2/5233 136/230 |
| 2010/0192506 A1 * | 8/2010 | Allred, III | ................ | E04C 3/08 52/655.1 |
| 2013/0008431 A1 * | 1/2013 | Fitch | ...................... | F24J 2/4638 126/601 |
| 2014/0117190 A1 * | 5/2014 | Werner | ...................... | F24J 2/14 248/346.03 |
| 2014/0150845 A1 * | 6/2014 | Chang | ........................ | F24J 2/38 136/246 |
| 2015/0060605 A1 * | 3/2015 | Tserodze | .................. | F24J 2/523 244/172.6 |
| 2015/0292773 A1 * | 10/2015 | Malan | ..................... | F24J 2/523 211/41.14 |
| 2016/0298354 A1 * | 10/2016 | Gauche | ................... | E04H 12/20 |

* cited by examiner

FRAME SUPPORTED HEIGHT ADJUSTABLE PYLON

CROSS-REFERENCE(S) TO RELATED APPLICATIONS

This application claims priority from South African provisional patent application number 2015/02201 filed on Apr. 7, 2015, which is incorporated by reference herein.

FIELD OF THE INVENTION

This invention relates to a frame supported height adjustable pylon that may, for example, be used to support items such as a heliostat, a photovoltaic panel, a water heating panel whether it be of the flat panel type or composed of multiple vacuum tubes, a wind turbine (aerofoil powered generator) or other wind activated machine, or any other item that requires stable support in a particular place especially, although not exclusively, so that the item can track, for example, an energy source.

BACKGROUND TO THE INVENTION

Many items of the general nature identified above have the characteristic that it is important for the item to be adjusted in position according to prevailing circumstances and, in particular, according to the time of day. In particular, adjustment of the position of the item may be necessary according to the position of the sun in the instance of solar activated items or according to the direction in which the wind is blowing in the case of a wind turbine or other wind activated machine, so that the energy source is tracked effectively.

For example, in the instance of a heliostat, the focusing of reflected solar energy accurately towards a central tower receiver is imperative and consequently the stability of the supporting structure must ensure the necessary accuracy. However, the support structures for the heliostats in such an application are responsible for an appreciable proportion of the capital expenditure on an entire installation.

In consequence of this, the development of a less costly support structure has been an ongoing challenge and one support structure that has been evolved forms the subject matter of our published international patent application WO2014072905. As shown in accompanying FIG. 1, the support structure in that instance provides a single stable pylon (A) for each heliostat (B) and the pylons are arranged in a triangular pattern with the pylons being secured together by girders (C), preferably in the form of trusses, secured to projecting plates (D) welded to the pylons and forming a framework therewith. It is considered that this arrangement will work effectively when installed on relatively even ground but may be somewhat problematical on at least some types of undulating ground. It also involves a significant amount of welding that contributes to the cost of the support structure and welds require additional corrosion protection.

It is considered that there is yet appreciable scope for improvement in an arrangement of pylons and a supporting frame for purposes such as this or for supporting any other items such as those identified above.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with this invention there is provided a height adjustable pylon and supporting frame assembly in which the frame includes two frame members meeting at a corner with the frame members being generally co-planar and the pylon being urged into the corner so as to extend at generally right angles to a plane including the two frame members, and at least one fastener assembly having two end portions each of which is anchored relative its associated frame member so as to extend transversely relative to the associated frame member and wherein the fastener assembly includes an intermediate saddle portion engaging a surface of the pylon that is directed outwardly relative to the corner so that the pylon is urged by the fastener assembly into the corner when the fastener assembly is tightened to thereby engage the pylon and lock it axially relative to the frame members in a selected position.

Further features of the invention provide for each of the end portions of the fastener assembly to pass through or around the associated frame member; for a head or nut to engage an outside of the associated frame member to anchor it relative to the frame member; for the fastener assembly to be a single elongate fastener having an arcuate central saddle portion formed to closely follow the outer surface of the pylon and two straight end portions that constitute said end portions; for the angle at which the frame members meet each other at the corner to be a right angle or an acute angle, preferably an acute angle of about 60°; and for the surface of the frame members engaged by the pylon to be preformed to provide a contact surface conforming substantially to the outer surface of the pylon.

Still further features of the invention provide for the frame members to be tubular frame members conveniently made of a deformable metal or other suitable material that can be formed to provide said contact surfaces and flattened and perforated ends that are bolted together; for each of the frame members to be part of one of two trusses each of which is composed of an upper straight frame member and a lower straight frame member with the two upper and the two lower frame members serving as frame members defined above with each truss having a fastener assembly associated with it wherein inclined brace members extend between the upper and lower straight frame members of each truss; and for the brace members to be tubular or of any suitable cross-sectional shape such as angle iron, channel section, flat bar with flattened ends and a flattened central region that may be perforated to accommodate bolts, rivets or other fasteners passing through them with the central flattened region having an elongate longitudinal slot allowing for adjustment of the relative positions of the two straight frame members to accommodate undulations in a supporting surface.

Preferably, the brace members are limited in number to a single elongate brace member for each span of frame members between adjacent pylons.

It is a particular feature of the invention that the vertical adjustment of the pylons can be employed to cause the lower ends of multiple pylons to engage a supporting surface to support both the frame and the pylons supported thereby.

The adjustment of the axial positions of the pylons is preferably enabled by a fastener assembly that bridges a corner between two joined straight frame members with the pylon firmly clamped between the end regions of the frame members and the fastener. The flattened ends of the brace can be secured to the other of the upper and lower straight frame members by single screw threaded fasteners, rivets or other fasteners passing through aligned holes in them.

The invention also provides a pylon and generally horizontal supporting frame assembly in which the frame assembly includes multiple frame members supporting multiple pylons extending at generally right angles to a plane of the frame, wherein each pylon is height adjustable relative to the plane of the frame assembly and has associated with it a releasable clamping assembly for clamping each pylon such that the pylon and supporting frame assembly can be supported on a supporting surface with multiple pylons having their lowermost ends engaging the supporting surface.

In order that the invention may be more fully understood one embodiment thereof will now be described with reference to the accompanying drawings.

DETAILED DESCRIPTION WITH REFERENCE TO THE DRAWINGS

Figure 1:
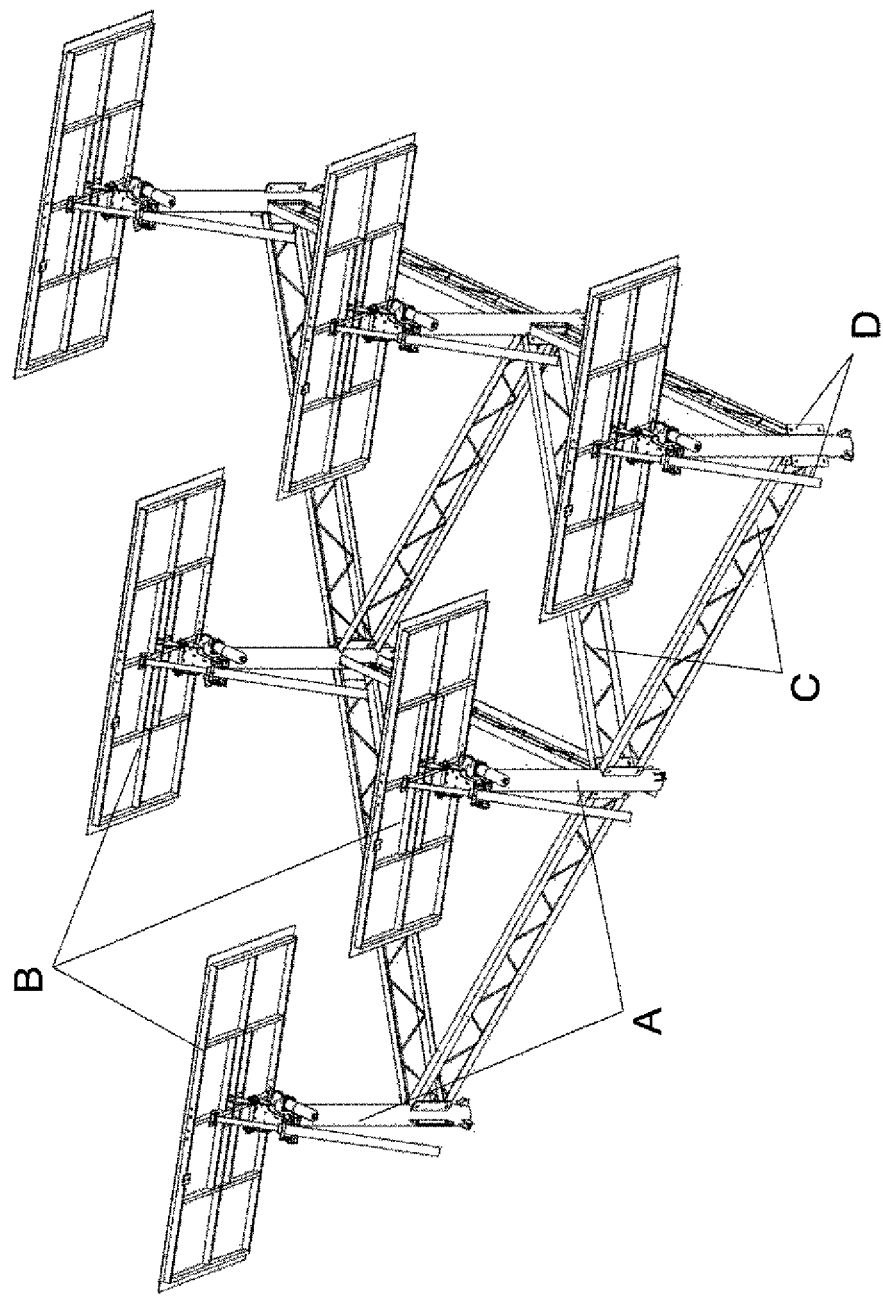
FIG. 1 is illustrates in three-dimensional view one example of prior art type of pylon and supporting frame assembly of the general nature with which this invention is concerned.

In the embodiment of the invention illustrated in FIGS. 2 to 9 of the drawings, the invention is applied to a frame assembly (1) that supports multiple height adjustable pylons (2) that, in this particular instance, may be used to support heliostats as indicated above. The supporting frame assembly in this instance has multiple frame members pairs of which form parts of trusses each composed of an upper straight frame member (3) and a parallel lower straight frame member (4) with the two frame members being held in parallel relationship by inclined brace members (5) extending between the upper and lower straight frame members. The free ends (6) of the frame members are flattened and perforated to receive connecting bolts (7) passing through overlapped flattened ends.

The brace members are of tubular metal and have flattened ends (8) that are also perforated to accommodate bolts (9) passing through them and a flattened central region (11) has an elongate slot (12) that allows for longitudinal adjustment of the relative positions of the two straight frame members to accommodate any undulations in a support surface on which the pylons and supporting frame assembly are located. The brace elements intercept the upper straight frame member in order to strengthen it for people to stand on it whilst the lower frame member is less important from this perspective due to its generally close proximity to the ground which is typically not movable.

Figure 2:
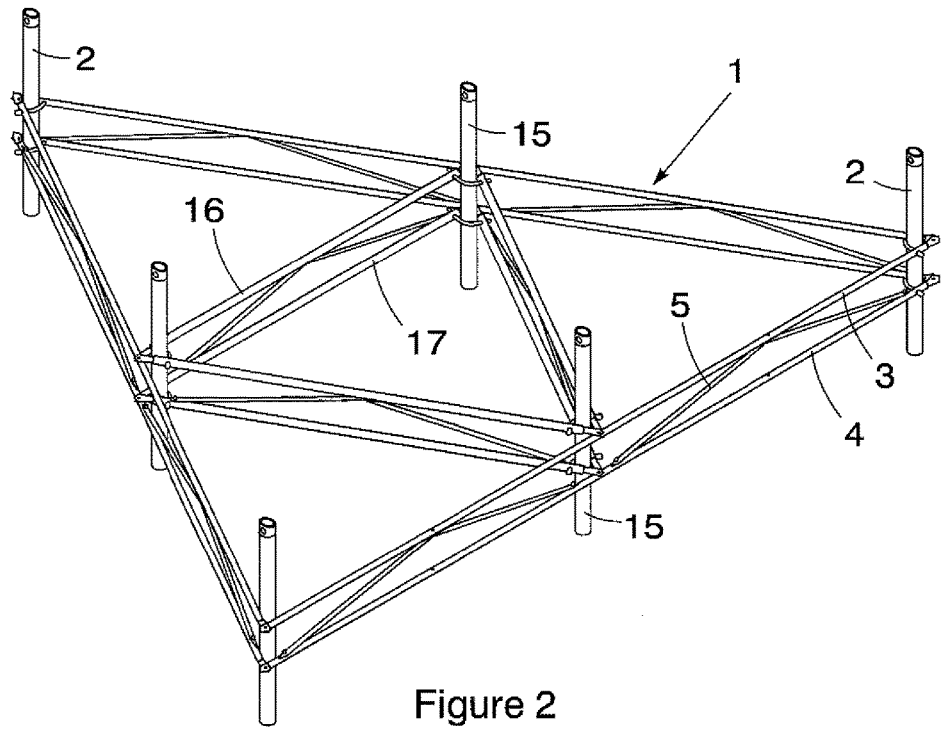
FIG. 2 is a similar three-dimensional view of an equivalent pylon and supporting frame assembly to which the present invention has been applied.

In the particular instance of the frame assembly illustrated in FIG. 2, the main supporting frame is of equilateral triangular shape in plan view with a side of the triangle being dimensioned to correspond with a standard commercially available length of metal tube, such as 6 meters, for example. A pylon (2) is supported by the frame at each corner of the main frame at a corner that makes an angle of 60° between the frame members.

In addition, three intermediate pylons (15) are supported midway between the corners of the main frame assembly in the corners of a triangular sub-frame that has its upper straight frame members (16) and lower straight frame members (17) attached to the midpoints of the main frame members (3, 4). In this manner corners are generated in the supporting sub-frame assembly to accommodate the three intermediate pylons (15). For economy of tubular material, each of the frame members of the sub-frame assembly is made to one half of a standard commercially available length of metal tube, in this instance 3 meters.

Figure 3:
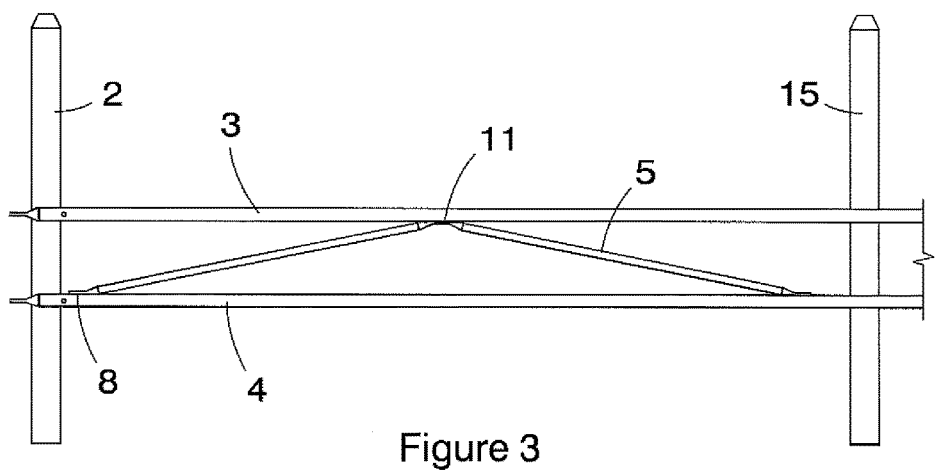
FIG. 3 is an elevation showing one half of one side or span of the assembly illustrated in FIG. 2.
Figure 4:
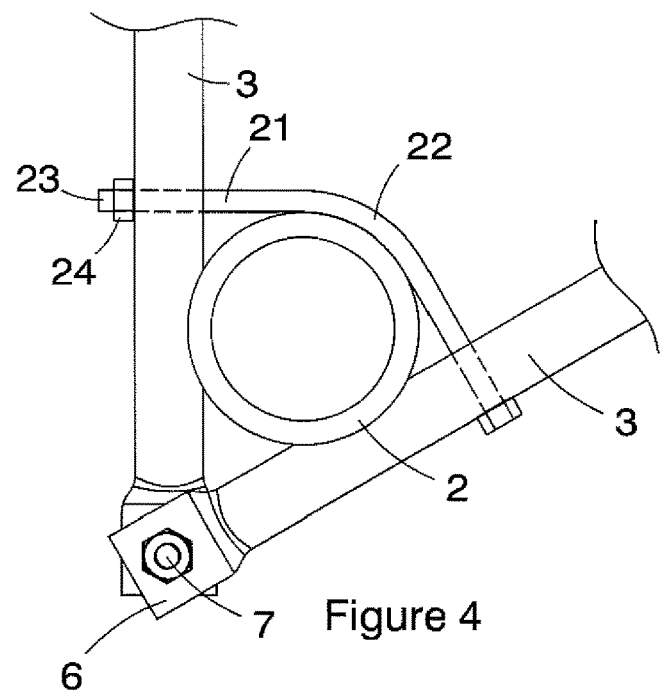
FIG. 4 is a schematic plan view showing one pylon and its relationship with an associated corner of the supporting frame assembly.
Figure 5:
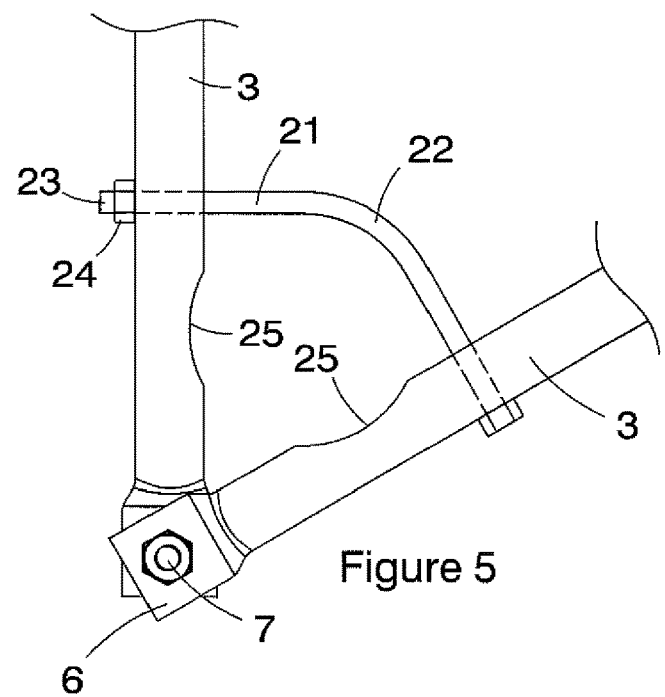
FIG. 5 is the same as FIG. 4 with the pylon removed so as to clearly illustrate the tubular frame members and associated fastener assembly.
Figure 6:
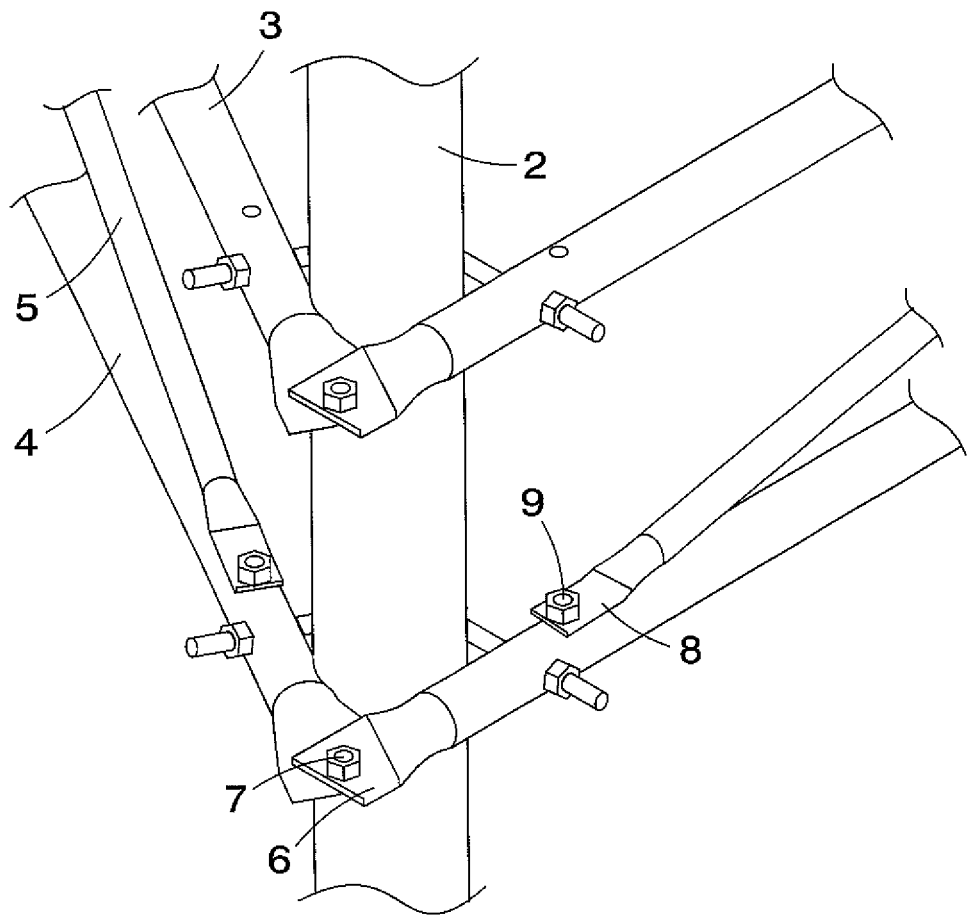
FIG. 6 is three-dimensional view of one corner of the supporting frame assembly showing two trusses connected together at a corner of the assembly and one pylon secured thereto.
Figure 7:
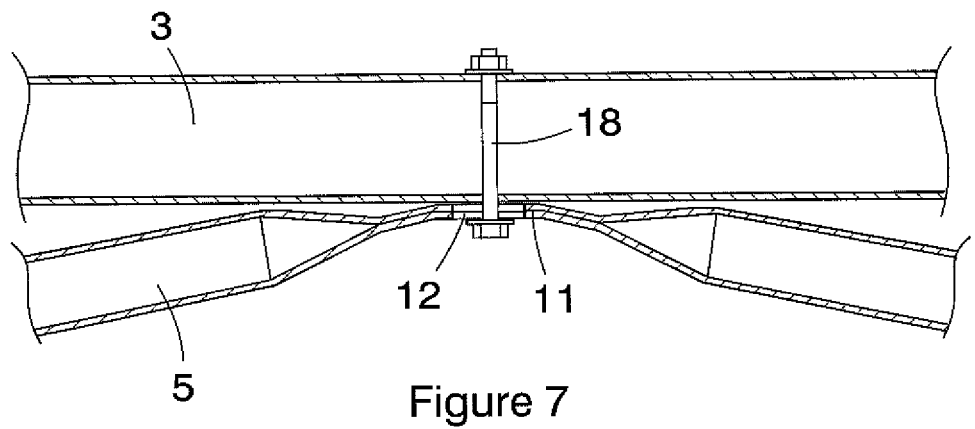
FIG. 7 is a sectional elevation detail showing the attachment of a tubular brace member secured to an upper straight frame member.
Figure 8:
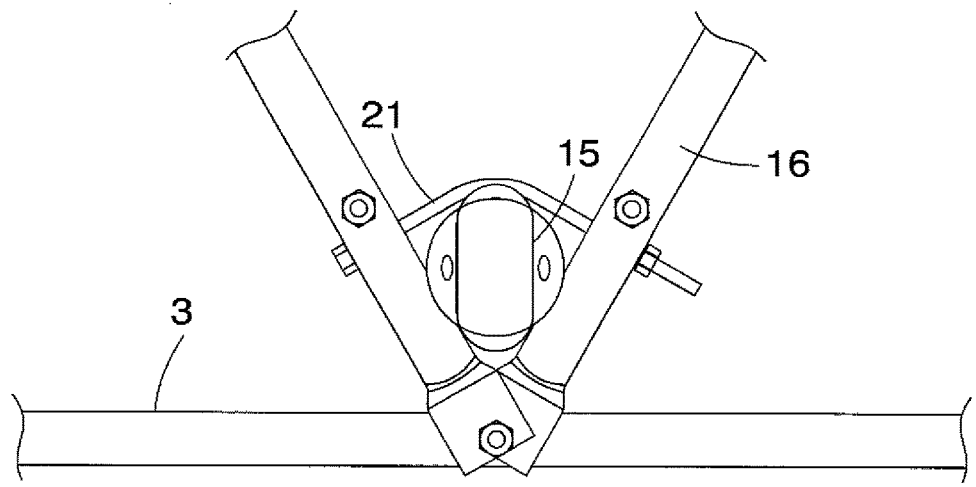
FIG. 8 illustrates, in plan view, the attachment of an intermediate pylon to a straight frame member.
Figure 9:
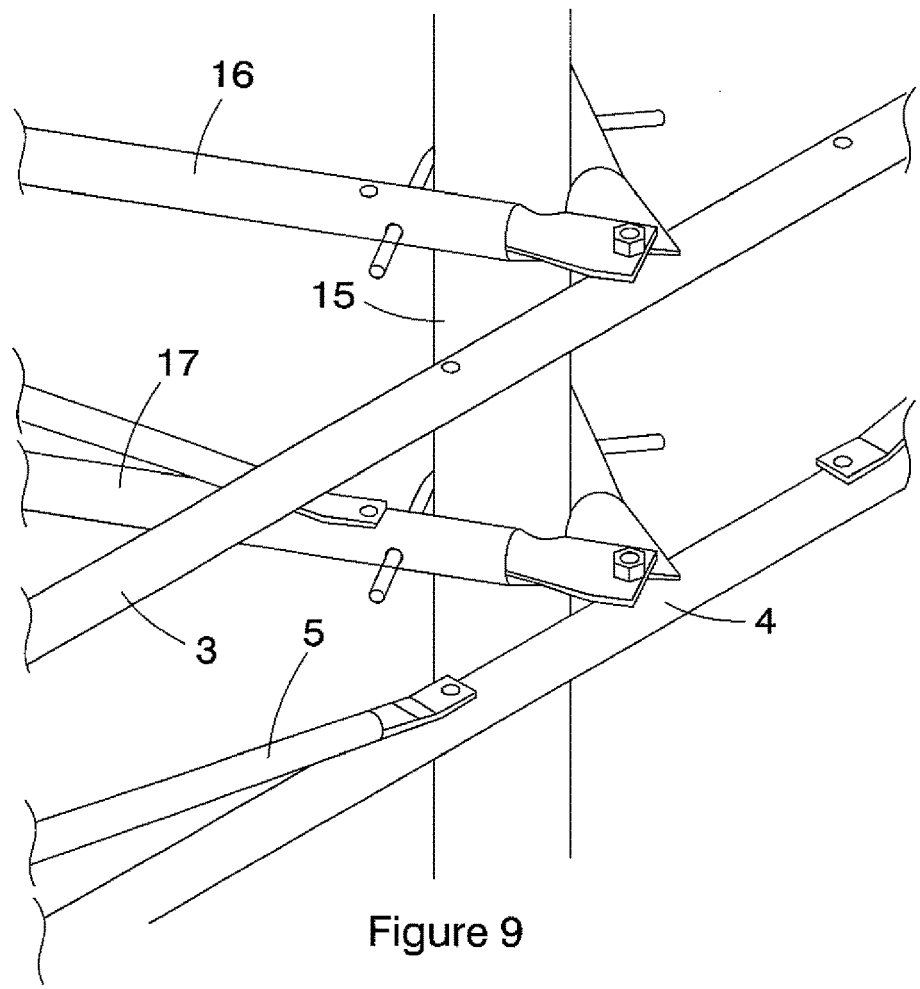
FIG. 9 is a three-dimensional view showing the attachment of trusses to each other where they intersect at a position where an intermediate pylon is supported by the frame assembly; and, FIG. 10 illustrates schematically in isometric view optional auxiliary components that may be used to stabilise a pylon should this be necessary.

The tubular brace members (5) are each composed of one half of the length of a standard commercially available tube and span between a position close to each pylon (2) and each intermediate pylon (15), as shown especially in FIG. 3. There is thus a single elongate tubular brace having its flattened central region secured to a central region of each span of the upper straight frame members (3, 16), and its two flattened end regions that are perforated and secured towards the end regions of the corresponding span of the lower frame members (4, 17).

The flattened central region (11) of each tubular brace is secured to the central region of the upper straight frame member (3,16) by means of a single screw threaded fastener (18) passing through the elongate slot (12) extending in the longitudinal direction so that it can accommodate alterations in the relative positions of the upper and lower straight frame members that may be occasioned by undulations in a supporting surface that cannot be practically accommodated by axial adjustment of the positions of the pylons.

The frame members are, in each case, generally co-planar and the associated pylon is urged into the associated corner so as to extend at generally right angles to a plane including the two frame members. A fastener assembly in the form of a single elongate fastener (21) having an arcuate intermediate saddle portion (22) engaging a surface of the pylon that is directed outwardly relative to the corner so that the pylon is urged by the fastener assembly into the corner region. The saddle portion is formed to closely follow the outer surface of the pylon and the fastener has two straight screw threaded end portions (23) each of which passes through the associated frame member with a nut (24) engaging an outside of the associated frame member. The straight end portions extend transversely, typically at almost right angles, relative to the associated frame member. The nuts (24) associated with each screw threaded end are such that when tightened, the nuts cause the saddle portion to engage the pylon and lock it axially relative to the frame members in a selected position.

In order to enhance the gripping effect of the frame members on the pylon, the surface of the frame members engaged by the pylon are pre-formed to provide a curved contact surface (25) conforming substantially to the outer surface of the pylon that is engaged by the frame member.

In each instance the frame members and brace members are tubular and made of a deformable metal that can be pressed to flatten the ends or a central zone of the brace members and to provide said contact surfaces and flattened perforated ends of the frame members that are bolted together. It is therefore convenient to use galvanised iron or steel in the fabrication of the various components as the only fabrication procedure to be carried out is to cut the lengths at one position and a cut end can be relatively easily provided with adequate corrosion protection, unlike welded zones.

The adjustment of the axial positions of the individual pylons and intermediate pylons is enabled by the associated fastener assembly that bridges a corner between two joined straight frame or sub-frame members with the pylon firmly clamped between the end regions of the frame members and the fastener.

The arrangement described above therefore provides a pylon and generally horizontal supporting frame assembly in which the multiple frame members support multiple pylons extending at generally right angles to a plane of the frame assembly, wherein each pylon is height adjustable relative to the plane of the frame assembly and has associated with it a releasable clamping assembly for clamping each pylon such that the pylon and supporting frame assembly is supported on a supporting surface with multiple, and preferably all of the pylons and intermediate pylons having their lowermost ends engaging the supporting surface.

Figure 10:
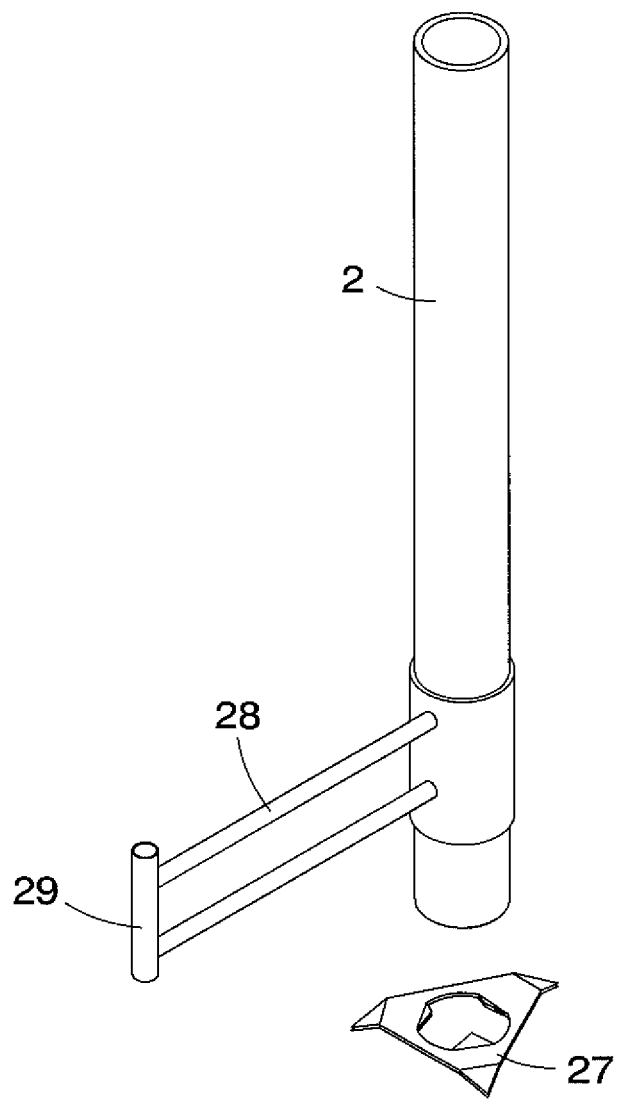

Of course, it may happen that the physical characteristics of the supporting surface are not particularly suitable in regions where some pylons are to engage the supporting surface and additional accessories such as a base plate (27) or radially extending leg (28) optionally having a sleeve (29) for receiving a laterally offset foot or a ground engaging screw (not shown). The latter are illustrated in FIG. 10.

In order to set up a pylon and supporting frame assembly as described above, the various pylons and frame members are assembled with associated brace members having a central flattened regions loosely connected to the upper frame members. Once this has been achieved, the bolts connecting the overlapped flattened ends of the frame members can be tightened. The height of each pylon may be adjusted prior to clamping the pylon in a selected vertical position relative to the supporting frame assembly which is carried out by clamping the two vertically spaced fastener assemblies associated with the upper and lower straight frame members in position. This can be followed by tightening of the bolts that connect the flattened ends of the brace members to the lower frame members and finally by tightening the bolts that secure the flattened central region of the brace members to the upper frame members. Following the above procedure or any other suitable procedure will enable the entire assembly to be supported on a reasonably undulating surface without any difficulties. Each pylon will be firmly clamped in its operative position.

In the event that, over a period of time, stresses develop in the supporting frame assembly, the bolts connecting the central regions of the brace members to the upper frame members can be loosened and re-tightened with the stresses having been relieved.

It will be understood that the upper and lower frame members operate as two sides of a parallelogram in contradistinction to the instance in which trusses comprise upper and lower frame members that are firmly and immovably attached to each other by multiple diagonal brace members that are typically welded to the frame members thereby necessitating considerable manual labour and material input and also considerable additional corrosion protection.

The arrangement of the invention therefore allows for parallel pylons in uneven terrain, something that it is anticipated will be rather valuable for accuracy of items such as heliostats. The truss structure is much simpler as there is no welding and accompanying additional corrosion protection required.

Of course, the basic geometry of the frame assembly in plan view can be changed widely and need not be based on a triangle as in the embodiment described above. Thus, for example, the shape of the frame could be square, rectangular, or of any other polygonal shape such as hexagonal.

Numerous variations may be made to the embodiment of the invention described above without departing from the scope hereof.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A pylon and supporting frame assembly comprising:
   two frame members meeting at a corner with the two frame members being generally co-planar and the pylon extending at generally right angles to a plane including the two frame members and the two frame members have flattened and perforated overlapping ends that are bolted or riveted together, wherein a surface of the two frame members engaged by the pylon is pre-formed to provide a contact surface conforming to an outer surface of the pylon, and
   at least one fastener assembly having two end portions each of which is anchored relative to its associated frame member so as to extend transversely relative to the associated frame member, and
   the at least one fastener assembly further comprises an intermediate saddle portion engaging a surface of the pylon that is directed outwardly relative to the corner and each of the end portions of the at least one fastener assembly pass through the associated frame member,
   wherein a connecting position of the pylon relative to the plane of the two frame members is vertically adjustable and the at least one fastener assembly engages the pylon and locks it axially relative to the two frame members in a selected vertical position.

2. The pylon and supporting frame assembly as claimed in claim 1, wherein the at least one fastener assembly is a single elongate fastener and the intermediate saddle portion is configured to closely follow an outer surface of the pylon.

3. The pylon and supporting frame assembly as claimed in claim 1, wherein the two frame members meet each other at the corner at an acute angle of about 60°.

4. The pylon and supporting frame assembly as claimed in claim 1, wherein the two frame members are tubular frame members made of a deformable metal that is configured to provide contact surfaces.

5. The pylon and supporting frame assembly as claimed in claim 1, comprising an upper two frame members and a lower two frame members, wherein each of the two frame members is part of one of two trusses with each truss having one or more inclined brace members extending between the upper straight frame member and lower straight frame member of each truss.

6. The pylon and supporting frame assembly as claimed in claim 5, wherein the inclined brace members are selected from a group consisting of tubular section, angle section, channel section, and flat bar with flattened ends and a flattened central region that are perforated to accommodate bolts, rivets or other fasteners passing through them.

\* \* \* \* \*